United States Patent
Thompson et al.

(10) Patent No.: US 7,712,127 B1
(45) Date of Patent: May 4, 2010

(54) METHOD AND SYSTEM OF ACCESS CONTROL BASED ON A CONSTRAINT CONTROLLING ROLE ASSUMPTION

(75) Inventors: Timothy J. Thompson, San Jose, CA (US); James Hartwell Holl, II, Los Gatos, CA (US); William Raoul Durant, Alamo, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 635 days.

(21) Appl. No.: 11/601,098

(22) Filed: Nov. 17, 2006

(51) Int. Cl.
*G06F 21/20* (2006.01)
*G06F 12/14* (2006.01)

(52) U.S. Cl. .................. 726/4; 707/9; 711/163

(58) Field of Classification Search .............. None
See application file for complete search history.

(56) References Cited

U.S. PATENT DOCUMENTS

| | | | |
|---|---|---|---|
| 5,761,669 A | 6/1998 | Montague et al. | |
| 5,911,143 A | 6/1999 | Deinhart et al. | |
| 6,023,765 A | 2/2000 | Kuhn | |
| 6,088,679 A | 7/2000 | Barkley | |
| 6,457,130 B2 | 9/2002 | Hitz et al. | |
| 6,985,955 B2 | 1/2006 | Gullotta et al. | |
| 2005/0193196 A1 | 9/2005 | Huang et al. | |
| 2006/0010483 A1 | 1/2006 | Buehler et al. | |
| 2007/0283443 A1* | 12/2007 | McPherson et al. | 726/26 |
| 2008/0016580 A1* | 1/2008 | Dixit et al. | 726/27 |

FOREIGN PATENT DOCUMENTS

| | | |
|---|---|---|
| DE | 199 54 358 | 7/2000 |
| EP | 1 124 172 | 8/2001 |
| WO | WO 02/50691 | 6/2002 |
| WO | WO 02/073436 | 9/2002 |

* cited by examiner

*Primary Examiner*—Gary J Portka
(74) *Attorney, Agent, or Firm*—Blakely, Sokoloff, Taylor & Zafman LLP

(57) ABSTRACT

In an RBAC system, a capability is defined as including an operation and an object on which the operation is to be performed. The capability is assigned to a role, which is in turn assigned to a user. Whether a user's request to perform an operation on an object should be authorized is determined based on whether a capability to perform the operation on the object is assigned to a role which is in turn assigned to the user. Further, the authorization is determined based on the evaluation of the constraint(s) attached to the role. If the evaluation result of the constraint(s) disallows the user to assume the role, the user is prohibited from performing the operation on the object even the user has such capability.

14 Claims, 8 Drawing Sheets

METHOD AND SYSTEM OF ACCESS CONTROL BASED ON A CONSTRAINT CONTROLLING ROLE ASSUMPTION

FIELD OF THE INVENTION

At least one embodiment of the present invention pertains to access control systems, and more particularly, to a Role Based Access Control (RBAC) system.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). Servers are made by Network Appliance, Inc. of Sunnyvale, Calif.

In a SAN context, the storage server provides clients with block-level access to stored data, rather than file-level access. Some storage servers are capable of providing clients with both file-level access and block-level access, such as servers made by Network Appliance, Inc.

A business enterprise or other organization that manages large volumes of data may operate one or more storage servers. These storage servers may be connected to each other through one or more networks. The storage servers and other network components may be managed by one or more network administrators (also called "administrative users" or simply "administrators"), who are responsible for configuring, provisioning and monitoring the storage servers, scheduling backups, troubleshooting problems with the storage servers, performing software upgrades, etc. These management tasks can be accomplished by the administrator using a separate management console on the network, which is a computer system that runs storage management application software specifically designed to manage a distributed storage infrastructure. An example of such a storage management application is DataFabric® Manager (DFM), made by Network Appliance, Inc. of Sunnyvale, Calif.

To prevent unauthorized users from accessing and controlling functions of the storage servers, there is a need for some form of access control. One form of access control is Role Based Access Control (RBAC). Within an organization, roles are created for various job functions. The permission to perform certain functions is assigned to specific roles. Members of staff (or other system users) are assigned particular roles, and through those role assignments acquire the permissions to perform particular system functions.

Since users are not assigned permissions directly, but only acquire them through their role (or roles), management of individual user rights becomes a matter of simply assigning the appropriate roles to the user, which simplifies common operations such as adding a user, or changing a user's department.

In a prior art RBAC system, a user is allowed to assume a role that has already been assigned to him, in any circumstances. There are no other criteria for determining whether the user is allowed to assume the role. This limits the RBAC system's ability to provide more flexible access control.

SUMMARY OF THE INVENTION

The present invention includes a method and system of access control based on a constraint controlling role assumption (e.g., whether a user is allowed to assume a role). The method may be implemented in a role based access control system. According to the method, a constraint is specified to control whether a user is allowed to assume a role.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system of access control based on a constraint controlling role assumption (e.g., whether a user is allowed to assume a role) are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
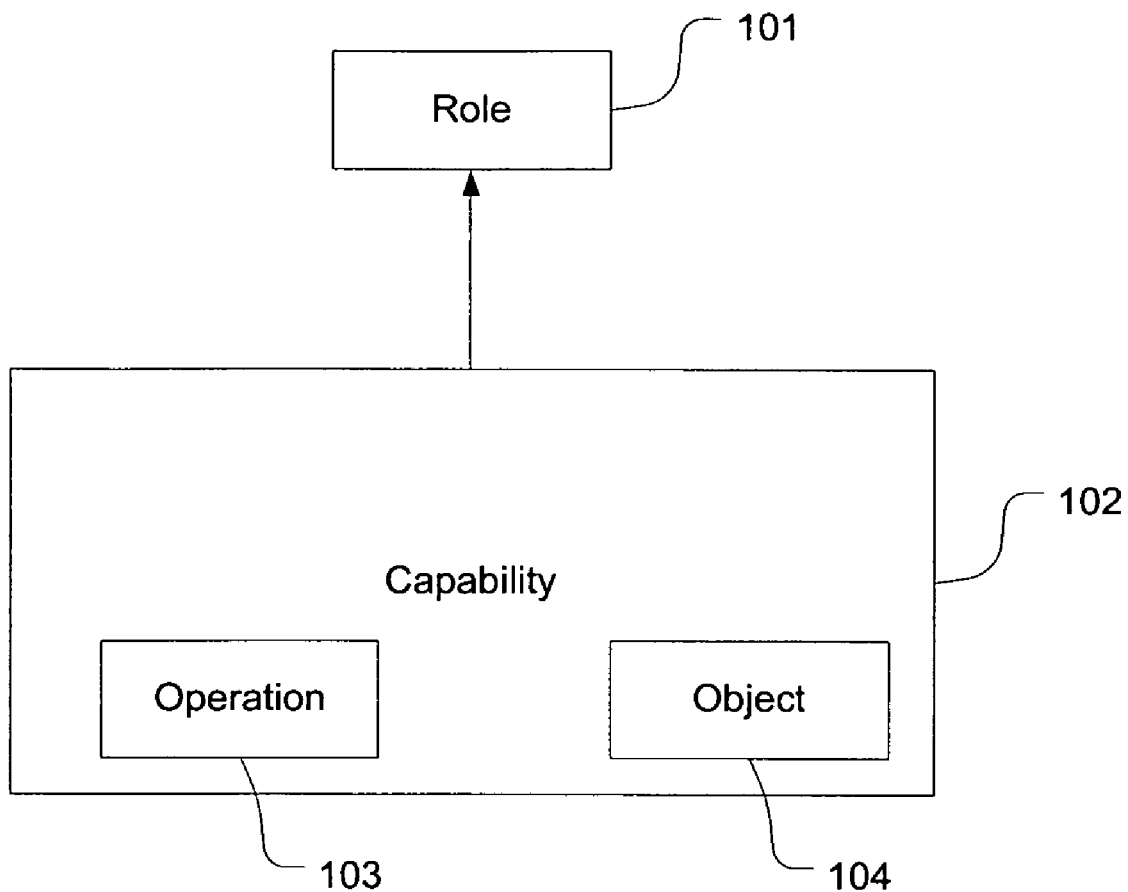
FIG. 1 illustrates a prior art Role Based Access Control (RBAC) system.

FIG. 1 illustrates a prior art Role Based Access Control (RBAC) system. As shown, a capability 102 can be assigned to a role 101. The capability 102 includes an operation 103 and an object 104, meaning that the role 101 to which the capability 102 is assigned is authorized to perform the operation 103 on the object 104. The operation 103 may be a standard operation or a user defined operation. For example, in a file system, an example of standard operation is creating a file in the file system. In a banking system, an example of user defined operation is creating a checking account for a customer.

The object 104 defines the target on which the operation 103 is to be performed. The object 104 may be any kind of physical or logical entity. For example, in a network storage environment, the object 104 may be a file system, a volume, a directory, a file, etc. Yet in the banking system mentioned above, the whole banking system would be the object 104 within which a checking account for the customer may be created.

More than one capability 102 may be assigned to a single role 101 simultaneously so that the role 101 is authorized to perform multiple operations on multiple objects. A role 101 may be assigned to a user (a system administrator, for example) so that the user may assume the capability or capabilities assigned to the role 101.

One aspect of the solution being introduced here is a method for specifying one or more constraints on the assumption of a role. Whether a user's request to perform an operation on an object should be authorized is determined based on whether the user has such capability (based on a user's role membership in a role that allows such capability) along with the evaluation of the constraint that must be satisfied before the user can assume that particular role. Here, the phrase "a user has such capability" means that the capability of performing the operation on the object is assigned to a role which is in turn assigned to the user. One example of the constraint may be a time range constraint. That is, only within the specified time range, the user is allowed to assume the role. Examples of values that may be used in a constraint include the CPU load of a storage server, the network load of a storage server, the memory usage of a storage server, the number of connections to a storage server or the number of active users currently accessing a storage server.

Figure 2:
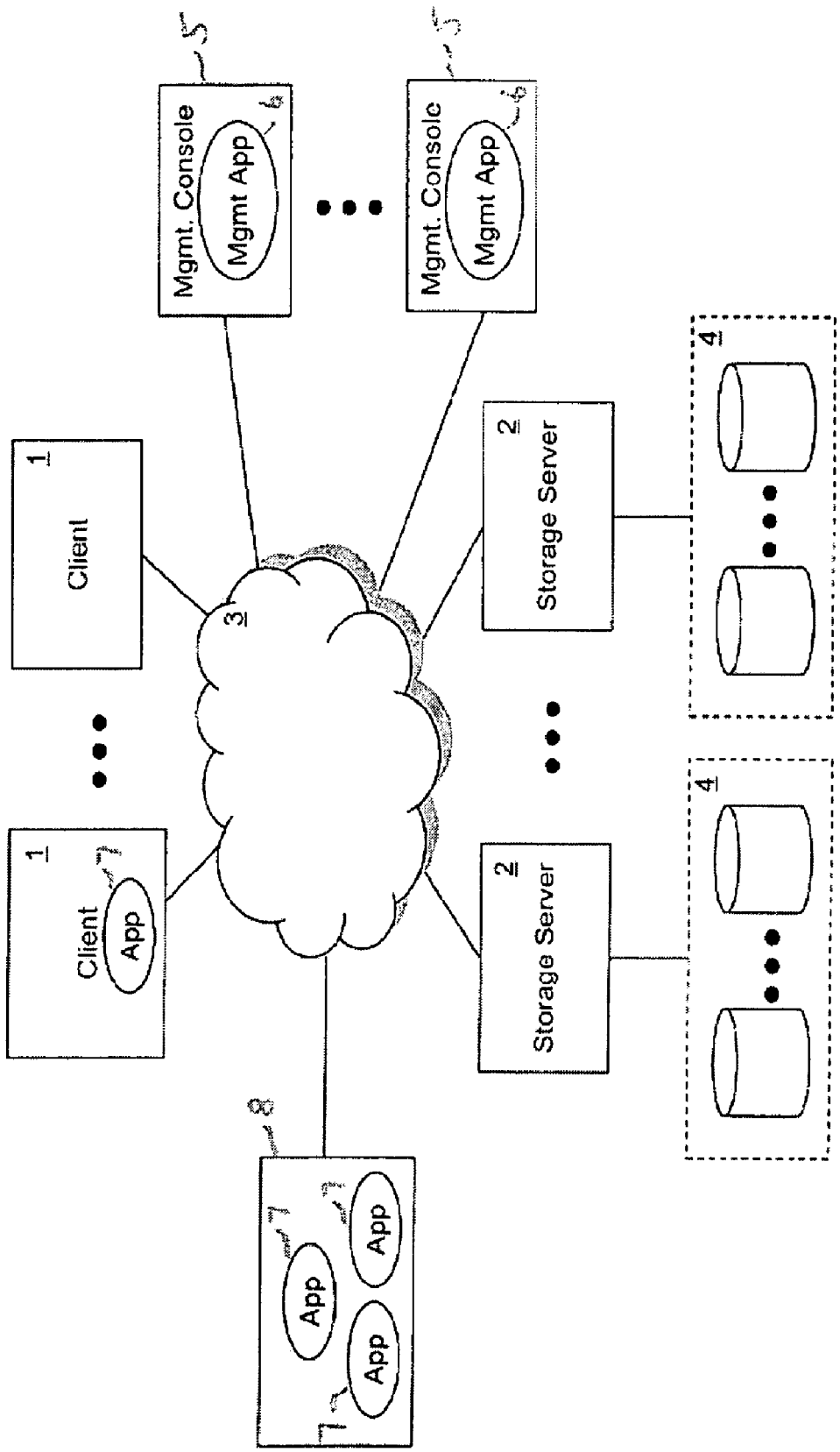
FIG. 2 shows a network environment in which the invention can be implemented.

FIG. 2 shows a network environment in which the solution can be implemented. In FIG. 2, a number of storage servers 2 are each coupled locally to a separate storage subsystem 4, each of which includes multiple mass storage devices. The storage servers 2 are also coupled through an interconnect 3 to a number of clients 1. Each storage subsystem 4 is managed by its corresponding storage server 2. Each storage server 2 receives and responds to various read and write requests from the clients 1, directed to data stored in or to be stored in the corresponding storage subsystem 4.

Each of the clients 1 may be, for example, a conventional personal computer (PC), server class computer, workstation, or the like. Each storage server 2 may be, for example, a file server used in a NAS mode (a "filer"), a block-based storage server such as used in a storage area network (SAN), or other type of storage server. In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

The mass storage devices in each storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in each storage subsystem 4 can be organized as a Redundant Array of Inexpensive Disks (RAID), in which case the corresponding storage server 2 accesses the storage subsystem 4 using an appropriate RAID protocol.

Also connected to the interconnect 3 are one or more management consoles 5, each of which includes a storage management application 6, such as a network storage manager discussed in detail below.

Recently, some storage servers have been designed to have distributed architectures, to facilitate clustering of storage nodes. Clustering facilitates scaling of performance and storage capacity. For example, rather than being implemented in a single box, a storage server may include a separate N- ("network") module and D- (disk) module, which are contained within separate housings and communicate with each other via some type of switching fabric or other communication medium. An N-module is an element that acts as a front-end of a storage server, exporting a file service abstraction to clients. A D-module manages the underlying storage. Each D-module typically manages a separate set of disks. Storage servers which implement the Data ONTAP® GX operating system from NetApp can have this type of distributed architecture.

Figure 3:
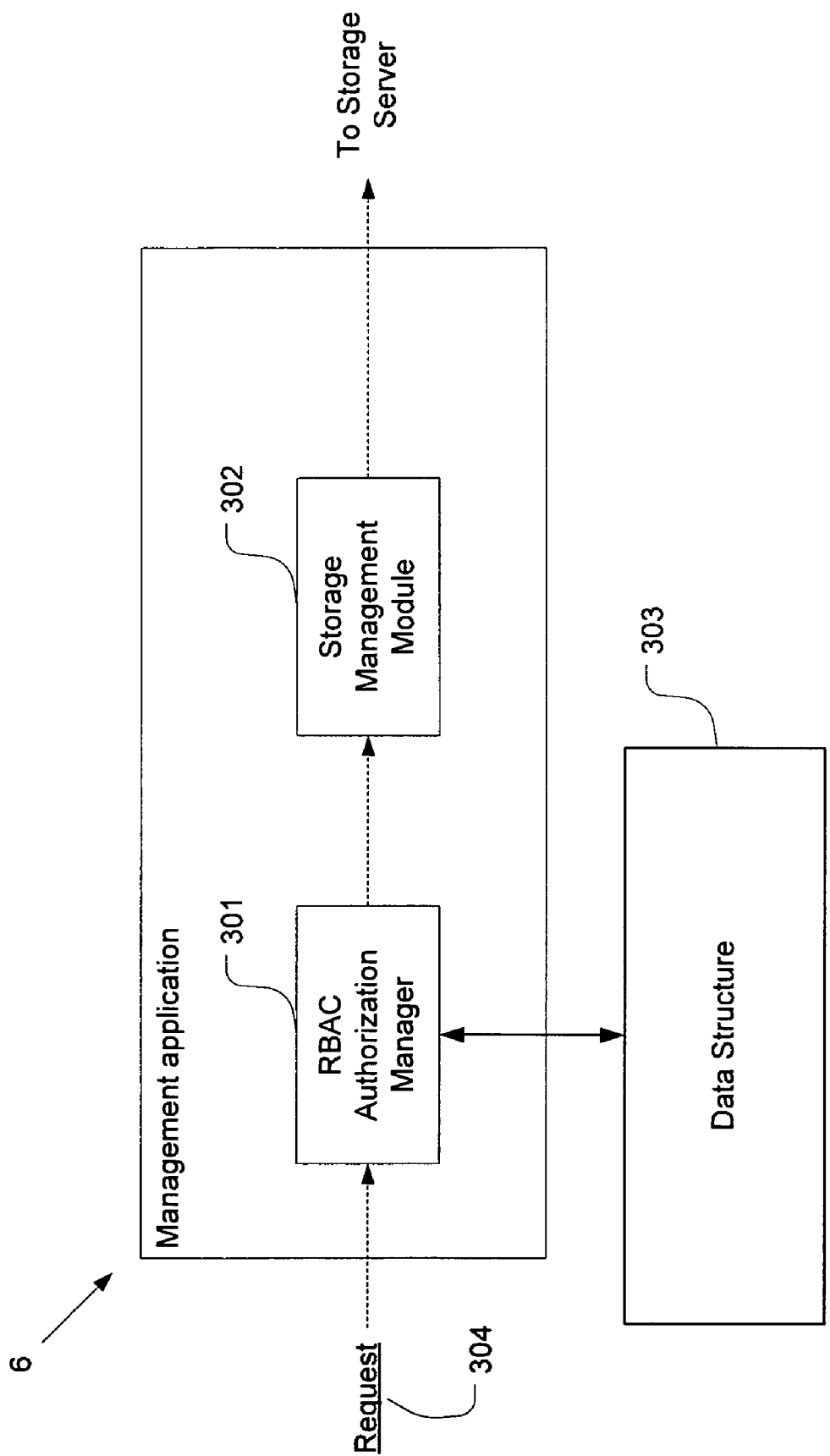
FIG. 3 is a schematic diagram of a management application shown in FIG. 2.

FIG. 3 is a schematic diagram showing an example of a management application 6 shown in FIG. 2. As shown in FIG. 3, the management application 6 includes an RBAC Authorization Manager 301 and a Storage Management Module 302. The RBAC Authorization Manager 301 and the Storage Management Module 302 provide a framework in which the present invention may be implemented. The RBAC Authorization Manager 301 receives a request 304 for accessing a storage server 2. The request 304 may be formatted as including an operation and an object on which the operation is to be performed. The request 304 may be initiated by a user (a system administrator, for example) via the management console 5. Thus, the request 304 may also include data representing the identity of the user. The RBAC Authorization Manager 301 receives the request 304, analyzes the request 304 and performs a look-up in the data structure 303 to determine whether the request 304 should be authorized. If the RBAC Authorization Manager 301 authorizes the request 304, the request 304 is then forwarded to the Storage Management Module 302, which performs the operation of the request by calling a specific command or Application Programming Interface (API) of the storage server 2. The data structure 303 stores data representing the roles, operations, objects and users of the storage system shown in FIG. 2. The data structure 303 may also store data related to the management of the storage servers 2.

Figure 4A:
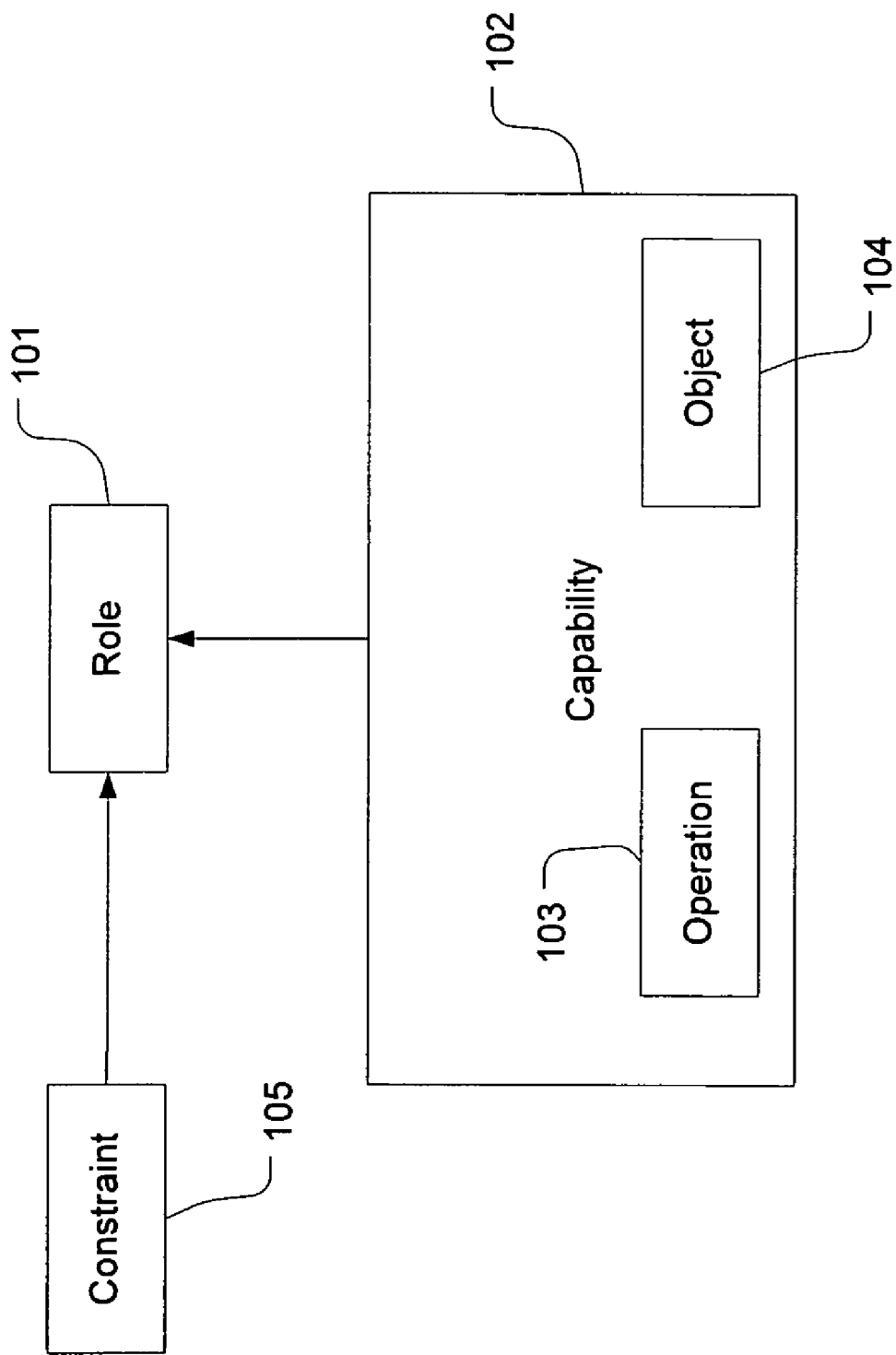
FIG. 4a illustrates an RBAC system according to an embodiment of the present invention.

FIG. 4a illustrates an RBAC system according to an embodiment of the present invention. As shown in FIG. 4a, the RBAC system is the same as the RBAC system described in FIG. 1, except that a constraint 105 is attached to the role 101. The constraint 105 controls whether a user is allowed to assume the role 101 even when the role 101 has already been assigned to the user. For example, suppose a capability 102 is defined as "backup the log file 'system.log' in volume engineering_a". Here, "backup the log file 'system.log'" defines the operation and "volume engineering_a" defines the object on which the operation is to be performed. Further, assume that the capability 102 is assigned to a role 101 "system administrator", and that there is a constraint "active only between 8:00 am and 9:00 am on each Sunday" attached to the role 101 "system administrator". If the role 101 "system administrator" is assigned to a user, then, without the constraint, the user should be able to assume the role 101 to perform the operation "backup the log file 'system.log'" on the object "volume engineering_a" anytime. However, since the constraint "active only between 8:00 am and 9:00 am on each Sunday" is attached to the role 101 "system administrator", the user may only assume the role 101 "system administrator" between the specific time range specified in the constraint.

Figure 4B:
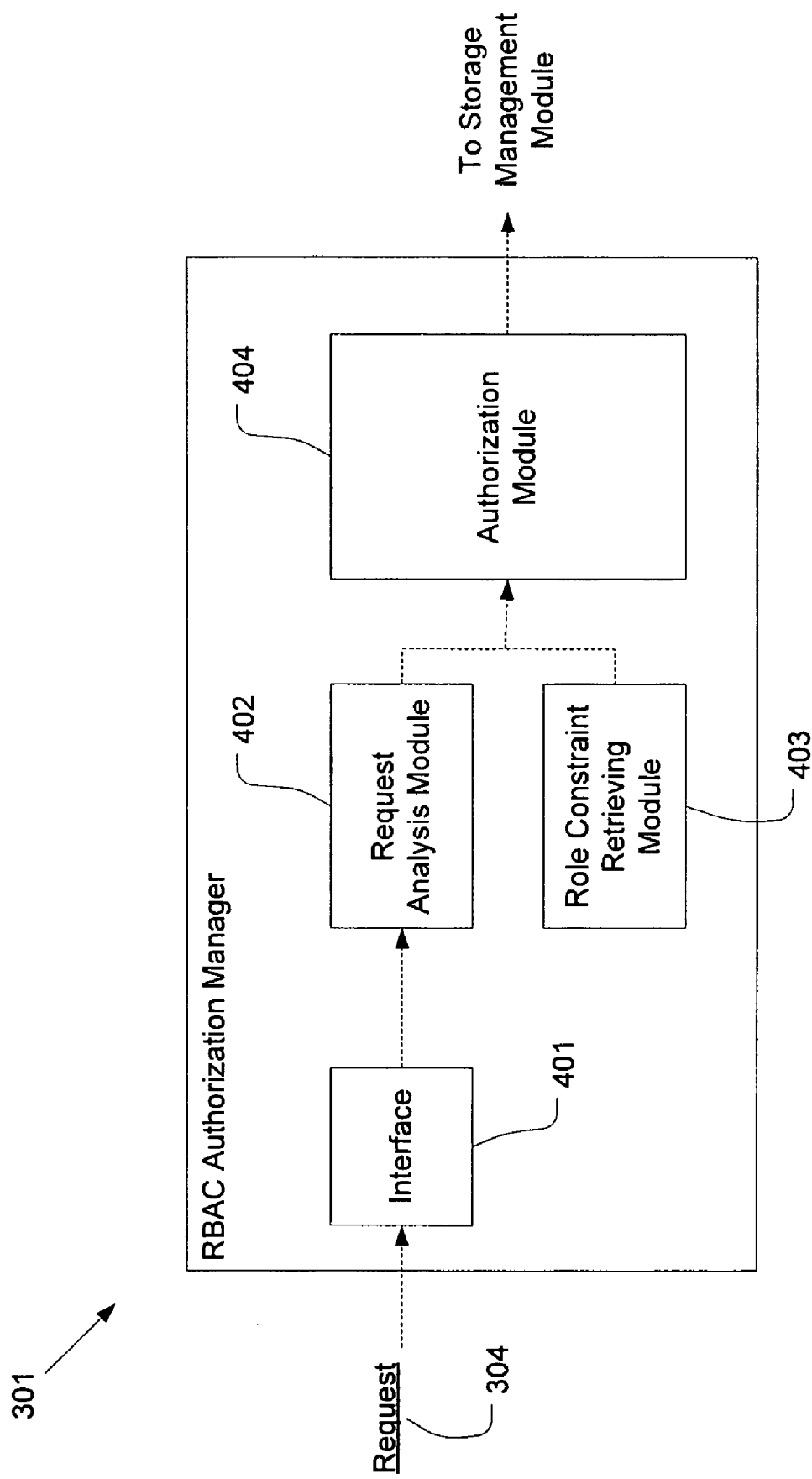
FIG. 4b is a schematic diagram of an RBAC Authorization Manager shown in FIG. 3.

FIG. 4b is a schematic diagram showing an example of an RBAC Authorization Manager shown in FIG. 3. As shown in FIG. 4, the RBAC Authorization Manager 301 includes an interface 401 to receive the request 304. The interface 401 provides a communication port between the RBAC Authorization Manager 301 and other modules of the management application 6, for example, the Graphical User Interface which receives requests from a user. The RBAC Authorization Manager 301 also includes a Request Analysis Module 402 to analyze the request 304 to identify the user who initiated the request 304, the operation associated with the request 304 and the object on which the operation is to be performed. Based on the identification of the user and the operation associated with the request, the Request Analysis Module 402 (or a separate module) looks up in the data structure 303 to determine whether there is a role assigned to the user. If there is a role assigned to the user, the Request Analysis Module 402 (or the separate module) further looks up the data structure 303 to determine whether the operation and object identified from the request matches the operation and object associated with any capability assigned to the role. If there is no such capability, then the request should be denied because the user has no such capability to perform the operation. Here, a first operation is considered to match a second operation if they are the same operation; and a first object is considered to match a second object if the first object is the second object or the first object is a part of the second object. The RBAC Authorization Manager 301 also includes a Role Constraint Retrieving Module 403, which looks up the data structure 303, for example, to determine whether there is a constraint on role assumption attached to the role. If there is such a constraint, the constraint is retrieved and sent to the Authorization Module 404. The Authorization Module 404 evaluates the constraint to determine whether the request should be authorized.

Going back to the same example illustrated in FIG. 4a, assume the current time is 10:00 am. In that case, the request to backup the log file 'system.log' in volume engineering_a should be denied, because a constraint "active only between 8:00 am and 9:00 am on each Sunday" is attached to the role. The user is not allowed to assume the role, even though the role has already been assigned to the user.

Note that the each of the modules introduced above (the Interface 401, the Request Analysis Module 402, the Role Constraint Retrieving Module 403 and the Authorization Module 404) can be software, special-purpose circuitry, or combination thereof.

Figure 5:
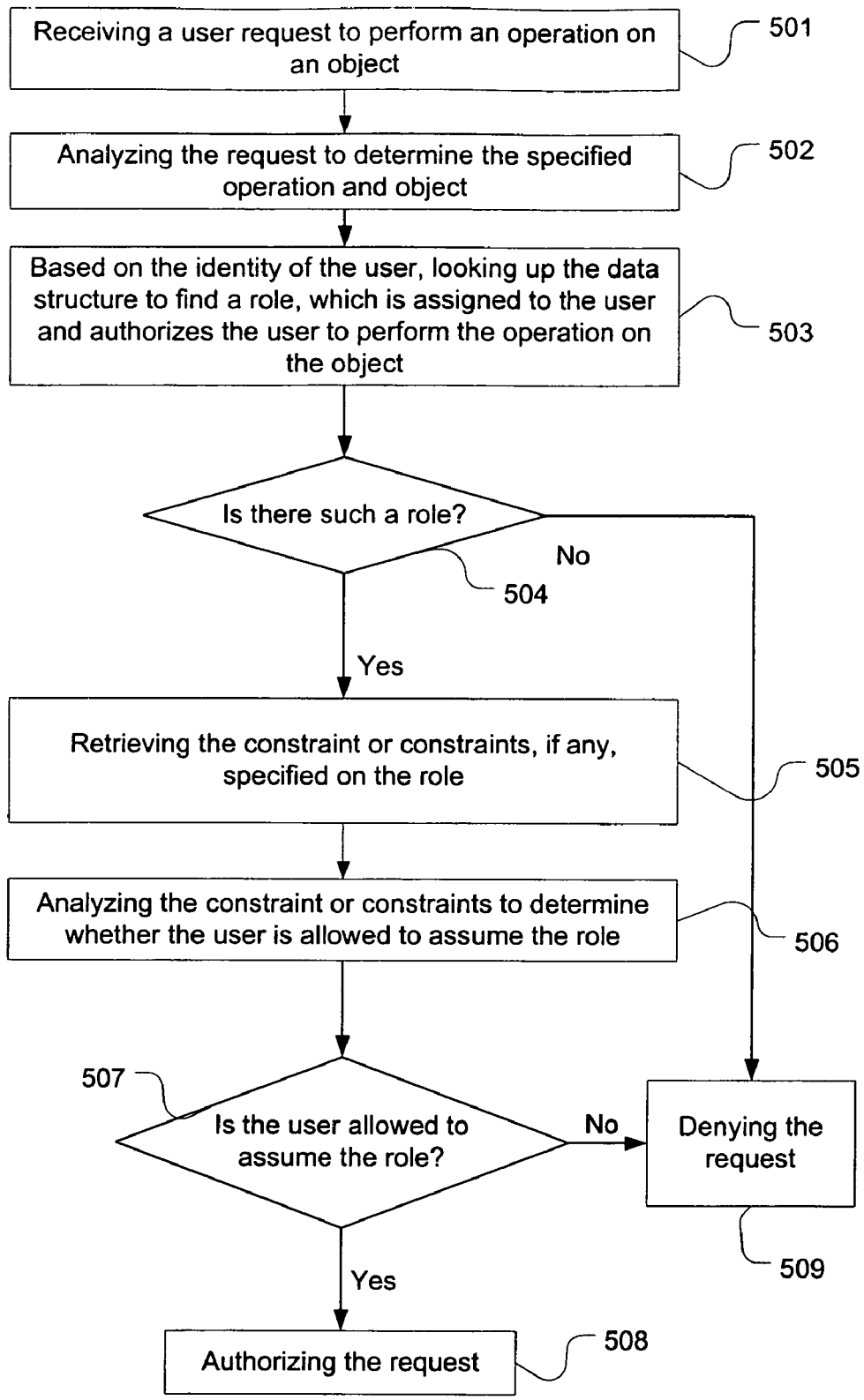
FIG. 5 is a flow diagram illustrating a process of access control according to an embodiment of the present invention.

FIG. 5 is a flow diagram illustrating an exemplary process of access control according to an embodiment of the present invention. FIG. 5 is illustrated with reference to FIGS. 3 and 4b. At step 501, the interface 401 receives a request initiated by a user to perform an operation on an object. At step 502, the Request Analysis Module 402 analyzes the request to determine the identity of the user, the operation requested and the object on which the operation is intended to be performed. At step 503, based on the identity of the user, the operation and object identified from the request, the Request Analysis Module 402 (or a separate module) performs a look-up in the data structure 303 to find a capability. The capability should have already been assigned to a role, which is in turn assigned to the user, and the operation and object associated with the capability should respectively match the operation and object identified from the request. At step 504, the process determines whether such a capability is found at step 503. If there is no such capability found at step 503, then the request is denied at step 509. If there is such a capability, determined at step 504, then at step 505, the Role Constraint Retrieving Module 403 looks up the data structure 303 to determine whether there is a constraint or constraints attached to the role. If there is such a constraint or constraints, then at step 506, the Authorization Module 404 evaluates the constraint(s) and determines whether the request should be authorized based on the evaluation result(s). In an exemplary embodiment of the present invention, a constraint is specified as a time range, as described above. Yet in another embodiment, a constraint is specified as a predetermined threshold of the CPU load of a storage server 2. If the current CPU load of the storage server 2 exceeds the predetermined threshold, the request should be denied because the user is not allowed to assume the role at this particular moment. In this case, the Authorization Module 404 calls a command or an Application Programming Interface (API) of the storage server 2 to find out its current CPU load. Other examples of values that may be used in a constraint include the network load of a storage server, the memory usage of a storage server, the number of connections to a storage server, and the number of active users currently accessing a storage server.

At step 507, if the Authorization Module 404 determines that the constraint(s) does not disallow the user to assume the role based on the results of the evaluation of the constraint(s), the request is authorized at step 508. Otherwise, the request is denied at step 509.

Note that attaching a constraint on role assumption directly to a role is only one possible implementation. The constraint on role assumption and the role may be stored separately.

RBAC can be used for enforcing a policy of separation of duty. Separation of duty is considered valuable in deterring fraud since fraud can occur if an opportunity exists for collaboration between various job related capabilities. Separation of duty requires that for particular sets of transactions, no single individual be allowed to execute all transactions within the set. The most commonly used examples are the separate transactions needed to initiate a payment and to authorize a payment. No single individual should be capable of executing both transactions. The system administrator can control access at a level of abstraction that is natural to the way that enterprises typically conduct business. This is achieved by statically and dynamically regulating users' actions through the establishment and definition of roles, role hierarchies, relationships, and constraints.

Figure 6:
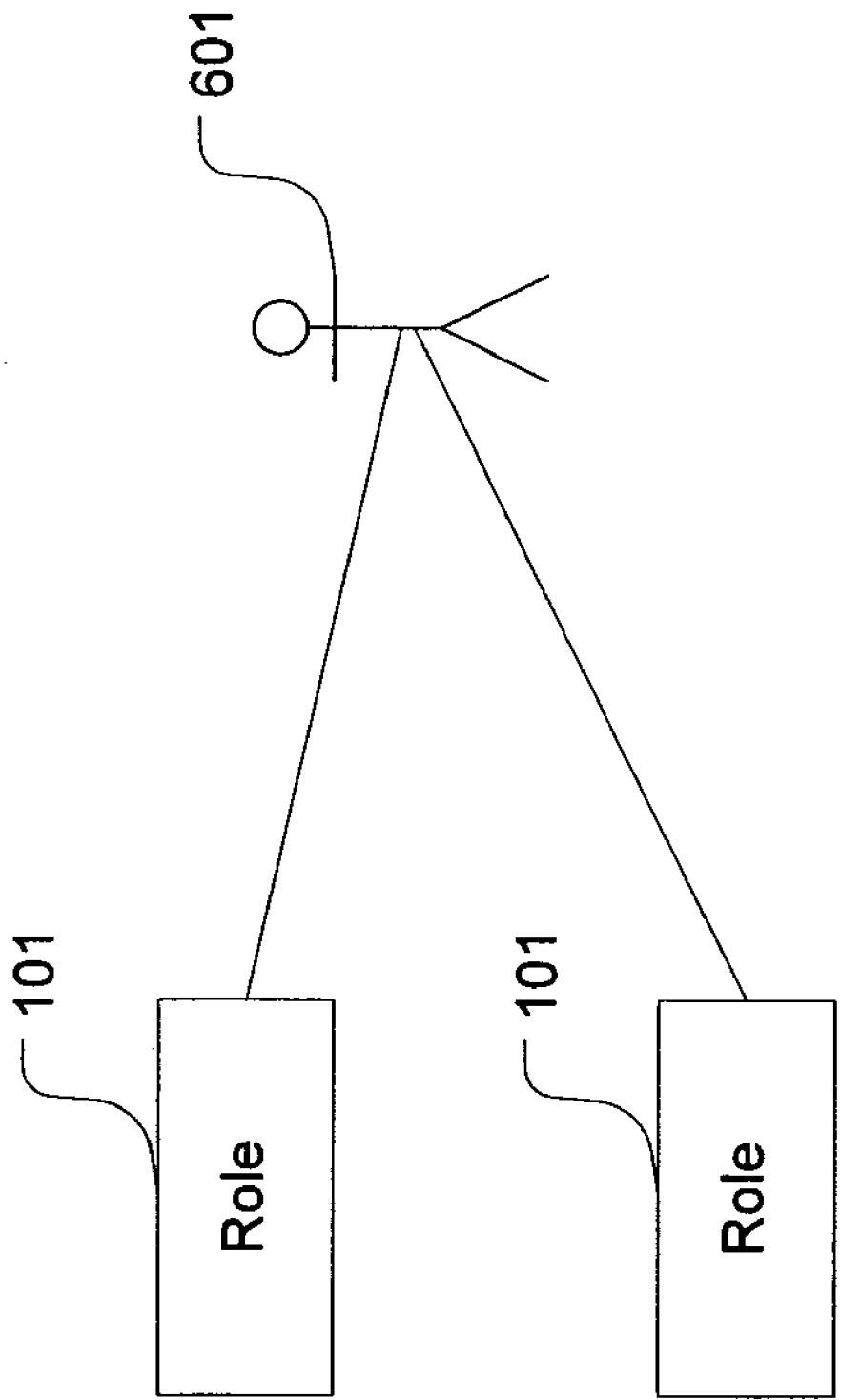
FIG. 6 illustrates a scenario of more than one role being assigned to a single user.

Static separation of duty means that roles which have been specified as mutually exclusive (or conflicting with each other) cannot both be included in a user's set of authorized roles. With dynamic separation of duty, users may be authorized for two roles that are mutually exclusive (or conflicting with each other), but cannot have both roles active at the same time. In other words, static separation of duty enforces the mutual exclusion rule at the time an administrator sets up role authorizations, while dynamic separation of duty enforces the rule at the time a user selects roles for a session. Here, a first role is considered to conflict with a second role if assuming the first and second roles by a same user simultaneously is against a policy of separation of duty. The policy is specified by an administrator. For example, a policy may specify that if a user has assumed the duty of managing corporate finances, the user should not assume the duty of managing employee records. Thus, as shown in FIG. 6, a user 601 may has two roles 101 assigned to him, but he may only assume on role at a particular time if the two roles 101 conflict with each other.

One aspect of the invention is to incorporate and implement the separation of duty principle into an RBAC system used for controlling access to a network storage system such as introduced in FIG. 2, therefore providing a more powerful and flexible access control mechanism.

Figure 7:
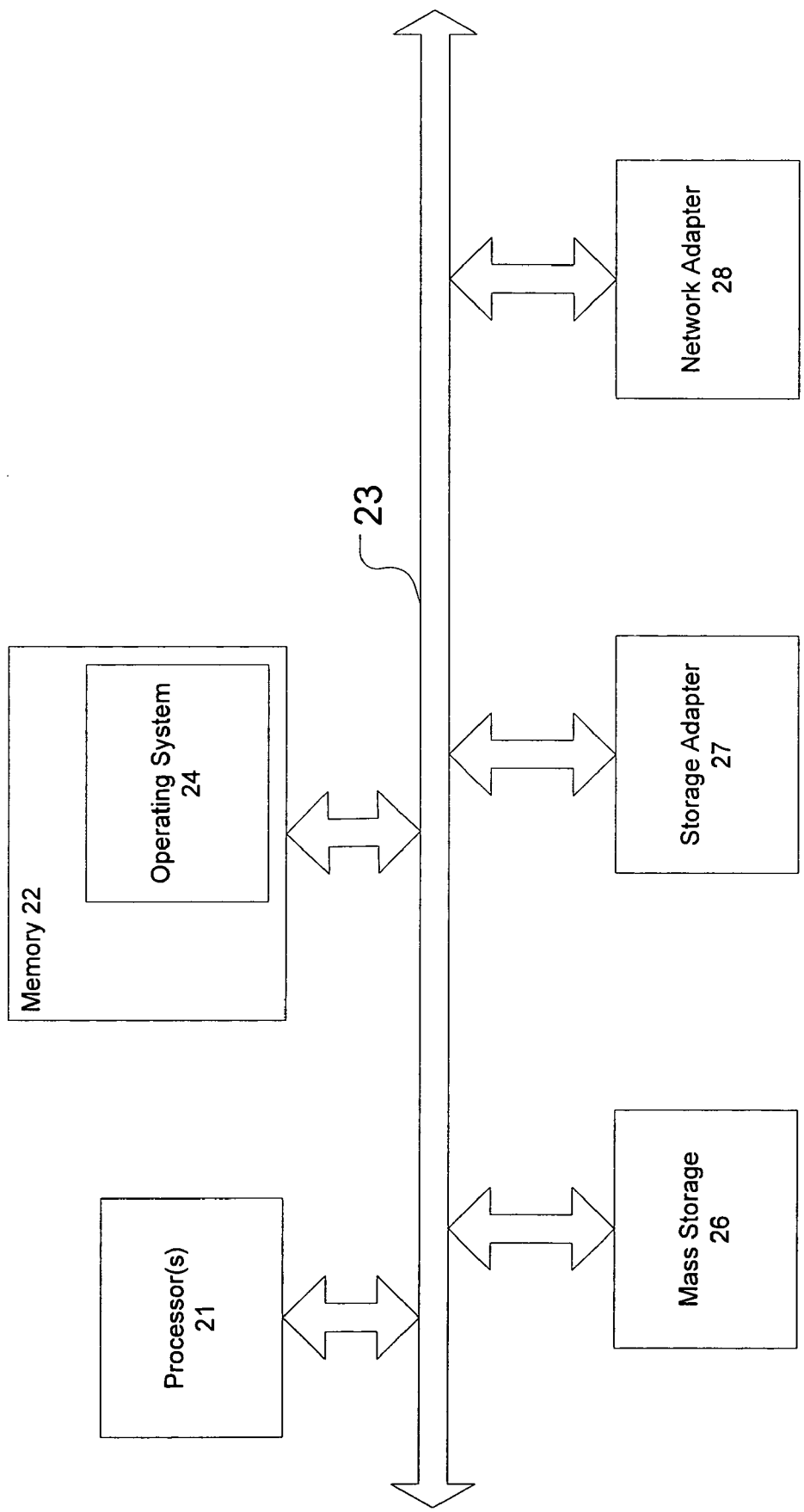
FIG. 7 is a high-level block diagram showing an example of the hardware architecture of a processing system.

FIG. 7 is a high-level block diagram showing an example of the hardware architecture of a processing system. The hardware architecture may be representative of either the storage server 2 or the management console 5 of FIG. 1. Certain standard and well-known components which are not germane to the present invention are not shown.

The processing system includes one or more processors 21 coupled to a bus system 23. The bus system 23 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the processing system and, thus, control the overall operation of the processing system. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 22 coupled to the bus system 43. The memory 22 represents any form of random access memory (RAM), read-only memory (ROM), flash memory, or a combination thereof. Memory 22 stores, among other things, the operating system 24 of processing system or the storage management application 6.

Also connected to the processors 21 through the bus system 23 are a mass storage device 26, a storage adapter 27, and a network adapter 28. Mass storage device 26 may be or include any conventional medium for storing large quantities of data in a non-volatile manner, such as one or more disks. The storage adapter 27 allows the processing system to access a storage subsystem and may be, for example, a Fibre Channel adapter or a SCSI adapter. The network adapter 28 provides the processing system with the ability to communicate with remote devices over a network and may be, for example, an Ethernet adapter or a Fibre Channel adapter.

Memory 22 and mass storage device 26 store software instructions and/or data, which may include instructions and/or data used to implement the techniques introduced here.

Thus, a method and system of access control based on a constraint controlling role assumption (e.g., whether a user is allowed to assume a role) have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for controlling access to a storage server comprising:
    receiving, by a storage management computer system, input from a first user specifying a constraint attached to a role assigned to a second user, the constraint to control whether the second user is allowed to assume the role;
    receiving a request from the second user to access the storage server, wherein the request includes an identity of the second user;
    determining the role assigned to the second user based on the identity of the second user;
    retrieving the constraint attached to the role of the second user, wherein the constraint specifies a condition defining whether the second user is allowed to assume the role to access the storage server;
    evaluating the constraint to determine whether the condition is satisfied to allow the second user to assume the role to access the storage server; and
    allowing the second user access to the storage server if the condition is satisfied.

2. The method of claim 1, wherein the constraint comprises a time range during which the second user is allowed or disallowed to assume the role.

3. The method of claim 1, wherein the constraint comprises a predetermined threshold to control whether the second user is allowed to assume the role.

4. The method of claim 3, wherein the predetermined threshold comprises a CPU load of the storage server, a network load of the storage server, a memory usage of the storage server, a number of connections to the storage server or a number of active users currently accessing the storage server.

5. The method of claim 1, wherein the storage management computer system comprises a network storage manager running in a management console coupled to the storage server via an interconnect.

6. A processing system comprising:
    an interface to receive input from a first user specifying a constraint attached to a role assigned to a second user, the constraint to control whether the second user is allowed to assume the role in a role based access control system to access a storage server, and the interface to receive a request from the second user to access the storage server, wherein the request includes an identity of the second user;
    a request analysis module to determine the role assigned to the second user based on the identity of the second user;
    a constraint retrieving module to retrieve the constraint attached to the role of the second user, wherein the constraint specifies a condition defining whether the second user is allowed to assume the role to access the storage server;
    an authorization module to evaluate the constraint to determine whether the condition is satisfied to allow the second user to assume the role to access the storage server.

7. The processing system of claim 6, wherein the constraint comprises a time range during which the second user is allowed or disallowed to assume the role.

8. The processing system of claim 6, wherein the constraint comprises a predetermined threshold to control whether the second user is allowed to assume the role.

9. The processing system of claim 8, wherein the predetermined threshold comprises a CPU load of the storage server, a network load of the storage server, a memory usage of the storage server, a number of connections to the storage server or a number of active users currently accessing the storage server.

10. The processing system of claim 9, wherein the interface and the authorization module are part of a network storage manager running in a management console coupled to the storage server via an interconnect.

11. A machine-readable medium having sequences of instructions stored therein which, when executed by a processor of a processing system, cause the processor to perform a process comprising:

receiving input from a first user specifying a constraint attached to a role assigned to a second user, the constraint to control whether the second user is allowed to assume the role to access a storage server, the storage server coupled to the processing system via an interconnect;

receiving a request from the second user to access the storage server, wherein the request includes an identity of the second user;

determining the role assigned to the second user based on the identity of the second user;

retrieving the constraint attached to the role of the second user, wherein the constraint specifies a condition defining whether the second user is allowed to assume the role to access the storage server;

evaluating the constraint to determine whether the condition is satisfied to allow the second user to assume the role to access the storage server; and allowing the second user access to the storage server if the condition is satisfied.

12. The machine-readable medium of claim 11, wherein the constraint comprises a time range during which the second user is allowed or disallowed to assume the role.

13. The machine-readable medium of claim 11, wherein the constraint comprises a predetermined threshold to control whether the second user is allowed to assume the role.

14. The machine-readable medium of claim 13, wherein the predetermined threshold comprises a CPU load of the storage server, a network load of the storage server, a memory usage of the storage server, a number of connections to the storage server or a number of active users currently accessing the storage server.

* * * * *